C. MÖLLER.
OPTICAL REVERSING SYSTEM.
APPLICATION FILED JAN. 28, 1910.

986,642.

Patented Mar. 14, 1911.

Witnesses:

Inventor:

UNITED STATES PATENT OFFICE.

CARL MÖLLER, OF IHRINGSHAUSEN, GERMANY, ASSIGNOR TO AKT.-GES. HAHN FÜR OPTIK UND MECHANIK, OF IHRINGSHAUSEN, NEAR CASSEL, GERMANY.

OPTICAL REVERSING SYSTEM.

986,642.     Specification of Letters Patent.     Patented Mar. 14, 1911.

Application filed January 28, 1910. Serial No. 540,724.

*To all whom it may concern:*

Be it known that I, CARL MÖLLER, a citizen of the Empire of Germany, residing at Ihringshausen, near Cassel, in the Empire of Germany, have invented a new and useful Ocular Reversing System, of which the following is a specification.

It is already known to combine the ocular lenses in optical instruments with reversing prism systems, however the angle of reflection was then 45°.

My invention relates to a new ocular reversing system, whereby the said angle of reflection is made larger, while every weakening of the light in connection with the total reflection is as far as possible excluded.

I will now proceed to describe my invention with reference to the accompanying drawing, in which—

Figure 1:
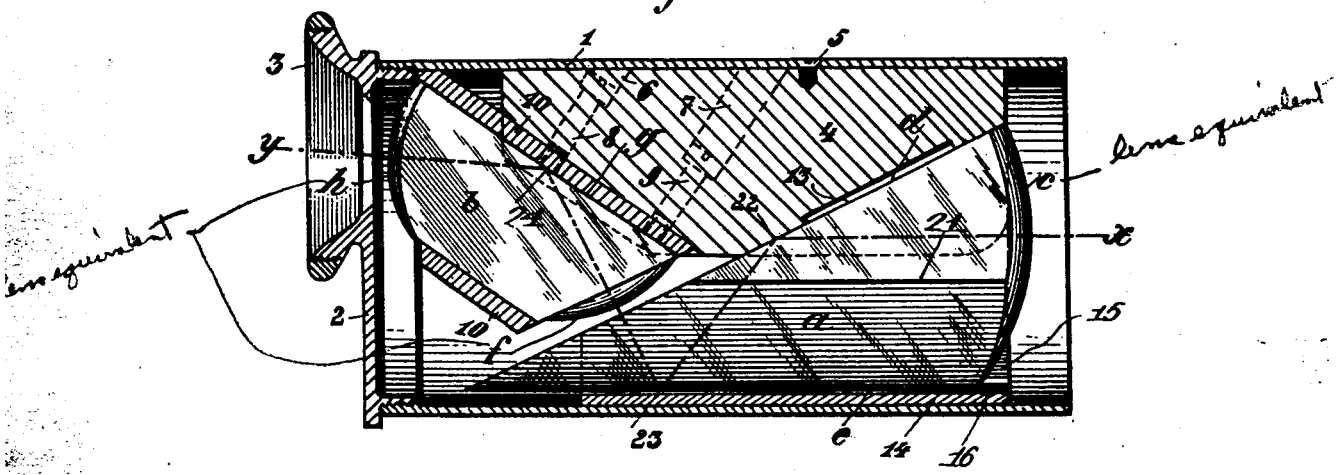
Figure 2:
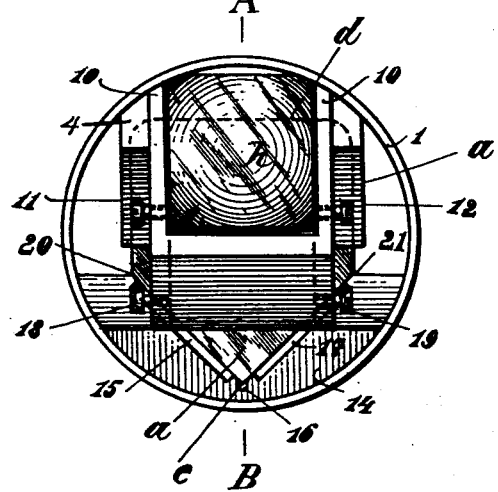

Figure 1 is a vertical longitudinal section through the new ocular reversing system in a mode of execution on the line A—B in Fig. 2, and Fig. 2 is an end view of the same, when looked at from the left in Fig. 1, the cover being removed.

Similar characters of reference refer to similar parts in both views.

A tube 1 is employed as a casing for supporting a prism system to be presently described and is closed at one end with a detachable cover 2 of any known construction. The cover 2 is shown to have an eccentric tubular connection 3 of any known construction, to which the eye can be applied for viewing the image produced by the prism system. The other end of the tube 1 (on the right in Fig. 1) is left open. Within the tube 1 a block 4 of the shape shown is fastened by means of a screw 5 or the like. The block 4 may be made from any suitable material, for example metal, celluloid, or the like. The upper surface of the block 4 is cylindrical, so that it fits closely to the inside of the tube 1. In Fig. 2 the contact surface between the block 4 and the tube 1 is for example shown to extend over an angle of about 90°. The sides of the block 4 in the longitudinal direction of the tube 1 are vertical and are shown to extend downward a little beneath the horizontal central plane of the tube 1. The bottom of the block 4 is substantially horizontal, as is indicated in Fig. 1 partly by full and partly by dotted lines. The two end faces of the block 4 are at right angles to the axis of the tube 1, the rear end face (in Fig. 1 on the right) extending down to the bottom, and the front end face (in Fig. 1 on the left) extending downward only for about half the radius of the tube 1. The front part of the block 4 is on the underside beveled off (as indicated by the dotted lines in Fig. 1) and is so cut out, that an inclined tube 10 of about a square cross section can be embedded in the cut thus formed. The tube 10 is fastened in the block 4 by means of two screws 8 and 9 introduced through suitable inclined holes 6 and 7. A bed 14 of metal or any other suitable material is fastened on the lower inside of the tube 1 by soldering or otherwise. The rear end face of the bed 14 is shown to be in the same plane as the rear end face of the block 4, while the front end face of the bed 14 is shown to be at some distance behind the front end face of the block 4. The bed 14 is longitudinally so cut out, as to form two oppositely inclined sides, which are at right angles to one another in the cross direction. In order to reduce the working of the two inclined sides to a minimum, the bed 14 is preferably provided with a groove 16 beneath the line of intersection $e$ and with two recesses 15 and 17 in the sides. The rear part of the block 4 is so cut out, that a prism $a$ of a shape to be described later on can be introduced into this cut and the cut of the bed 14 and be an exact fit. The front part of the bed 14 is at the top beveled off, so that the inclined faces so formed are in the same plane as the inclined bottom of the rear cut in the block 4. For similar reasons as mentioned above, this inclined bottom is also preferably provided with a recess 13.

The prism $a$ has an upper inclined face $d$, which is at right angles to the plane of the paper in Fig. 1. The prism $a$ has two parallel vertical faces in the longitudinal direction of the tube 1, which faces fit closely to the walls of the rear cut in the block 4. The prism $a$ has moreover on the lower side two oppositely inclined faces and consequently three edges $e$, 20 and 21 parallel to the axis of the tube 1, the two inclined faces forming an angle of 90° in Fig. 2. The prism $a$ has at last a spherical end face $c$ at the open end of the tube 1, the center of curvature of this spherical end face $c$ being preferably in the axis of the tube 1.

The inclined square tube 10 is at its ends beveled off, so that its upper end face (in Fig. 1 on the left) is at right angles to the axis of the tube 1, while its lower end face is parallel to the upper inclined face *d* of the prism *a* and in proximity of the same. A prism *b* of a square cross section is introduced into the inclined tube 10 and can be therein adjusted by means of suitable adjusting screws 11, 12, 18, 19. This prism *b* is shown to have a reflecting face *g* and two spherical end faces *f* and *h*, of which the lower one *f* is in proximity of the face *d* of the prism *a*, while the upper end face *h* is in proximity of the viewing tubular connection 3. Where so preferred, the lower end face *f* may be one side of a lens *i* (indicated by full and dotted lines in Fig. 1), which lens is fitted into a recess in the prism *b* and is therein fastened in any known manner. The spherical faces *c*, *f* and *h* are the equivalents of the lenses employed in ordinary ocular systems.

The two prisms *a* and *b* should fulfil the following requirements: When a central ray of light *x* emanating from some object passes in the axis of the tube 1 through the spherical end face *c*, it is to impinge upon the upper inclined face *d* of the prism *a* at the point 22, where it is to be totally reflected, so that it passes downward in the direction of the dotted line, until it strikes the lower edge *e* at the point 23, from which it is to be reflected, so that it passes in the axis of the lens *i* and strikes the upper face *g* of the inclined prism *b* at the point 24, where it is again to be totally reflected, so that it passes in the direction of the dotted line *y* and meets the eye near the tubular connection 3. The angle *x*, 22, 23, *i. e.* the sum of the angles of incidence and reflection, should be made so large, as is approximately shown, viz. about 120°, that the angles of incidence and reflection are each made greater than 45°, which is the purpose of my invention. The path 23, 24 of the central ray of light should be at right angles to the upper face *d* of the prism *a*. The angle 23, 24, *y*, *i. e.* the sum of the angles of incidence and reflection for the point 24, should be made about as large as the angle *x*, 22, 23, viz. about 120°, so that the angle of reflection is again made larger than 45°, according to the purpose of my invention. Then every weakening of the light by the total reflection will be as far as possible excluded.

The ray of light 24, *y* passing through the tubular connection 3 is shown to be a little inclined, but it will be understood, that the two prisms *a* and *b* can be, if so preferred, so constructed, that the central ray 24, *y* leaving the ocular device will be parallel to the entering central ray of light *x*, 22.

The spherical end face *c* of the prism *a* is assumed to receive an inverted negative image, that is an inverted and laterally reversed image, so that the image appearing in the viewing tubular connection 3 will be of course erected and positive in consequence of the combination of the erecting effect of the two reflecting faces *d* and *g* with the laterally correcting effect of the two oppositely inclined lower faces of the prism *a*. With the exception of the narrow space between the upper inclined face *d* of the prism *a* and the spherical surface *f* of the prism *b* every passage of the rays of light through air is excluded and the whole prism system is made very short. Where so preferred, the spherical surface *h* of the prism *b* may be replaced by a plane surface. In the new prism system the parallel displacement of the central ray of light is rendered small. It is even possible to so construct the prism system as to place the leaving central ray of light *y* in the same straight line as the entering central ray of light *x*. Of course this will be done only in case the other inconveniences produced by the enlargement of the prism *a* or by other alterations of the device are of no importance.

When the angles of reflection are nearly equal to the angle of total reflection, losses of light will easily result, more particularly if the reflecting faces of a prism are covered with damp and dust. In consequence of this the angles of reflection are with my device made as far as possible larger than the angle of total reflection.

It is not absolutely necessary, that the central ray of light *y* leaving the device be parallel to the entering central ray *x*, but they may form any angle.

According to the circumstances the two prisms *a* and *b* will necessarily be made from different sorts of glass, either the prism *a* being made of more strongly refractive material than the prism *b* or *vice versa*.

The ocular reversing system can be varied in many respects without departing from the spirit of my invention.

I claim:

1. In an ocular reversing system, the combination with a glass body having a large plane face, a spherical end face and two plane faces forming a corner opposite to said large face, the larger face being adapted to totally reflect a central ray of light coming from the spherical end face and to send it to the edge of the corner which in turn is adapted to reflect this ray and to send it through the large face at right angles to same, of a prism having a reflecting face, a spherical end face and a viewing end face, the spherical end face being adapted to receive the central ray of light from the large face of said glass body and to send it to the reflecting face which in turn is adapted to totally reflect it and to send it through the viewing end face, and means securing said glass body and said prism in relation to one another.

2. In an ocular reversing system, the combination with a glass body having a large plane face, a spherical end face and two plane faces forming a corner opposite to said large face while the edge of the corner forms an acute angle with the large face, the spherical end face being adapted to collect rays of light and to throw them on said large face which is adapted to totally reflect them and to throw them on the two faces of the corner, that are adapted to reflect the rays of light and to send them through the large face at the same time reversing the image, of a prism having a reflecting face, a spherical end face and a viewing end face, the spherical end face being in proximity to the large face of said glass body and being adapted to receive therefrom the rays of light and to send them to the reflecting face which in turn is adapted to totally reflect them and to send them through the viewing end face, and means securing said glass body and said prism in relation to one another.

3. In an ocular reversing system, the combination with a cylindrical casing open at one end and having a viewing tubular connection at the other end, of a bed on the inside of said casing, a holder on the inside of said casing above said bed, a glass body fitted in said bed and said holder and having two oppositely inclined plane faces forming a corner parallel to the axis of said casing, a large plane face forming an acute angle with the edge of the corner, and a spherical end face at the open end of said casing, an inclined prism in said holder and having a reflecting face, a spherical end face in proximity of the large face of said glass body and a viewing end face in proximity of the viewing tubular connection of said casing, said glass body being adapted to collect by means of its spherical end face rays of light, to totally reflect them by means of its large face, to reflect them by means of its two oppositely inclined faces while reversing the image and to send them through its large face, and said prism being adapted to collect by means of its spherical end face these rays of light, to totally reflect them by means of its reflecting face and to send them through its viewing end face.

CARL MÖLLER.

Witnesses:
   Andreas Martin,
   Taéole Pfaff.

---

Copies of this patent may be obtained for five cents each, by addressing the "Commissioner of Patents. Washington, D. C."